April 30, 1935  W. C. VAN GEEL ET AL  1,999,551

DRY PLATE RECTIFIER

Filed Oct. 7, 1931

INVENTORS
WILLEM CHRISTIAAN VAN GEEL
BY and HENDRIK EMMENS

ATTORNEY

Patented Apr. 30, 1935

1,999,551

UNITED STATES PATENT OFFICE 1,999,551

DRY PLATE RECTIFIER

Willem Christiaan van Geel and Hendrik Emmens, Eindhoven, Netherlands, assignors to Radio Corporation of America, a corporation of Delaware Application October 7, 1931, Serial No. 567,417
In the Netherlands October 8, 1930

4 Claims. (Cl. 175—366)

This invention relates to a dry plate rectifier. As a rule rectifiers of this type are constituted by two plate or strip shaped electrodes consisting of different materials and separated by a thin intermediate layer consisting of a third material. In many cases one electrode is made of a metal and coated with an oxide of the metal constituting the intermediate layer between both electrodes. However, also other intermediate layers are used.

It sometimes appears that rectifiers which have perfectly worked for a long time, abruptly lose their rectifying properties and consequently allow the passage of a current in both directions. This is probably due to puncturing of the intermediate layer between the outer electrodes.

According to the invention this drawback is successfully counteracted by adding a material yielding oxygen to the material of which one of the electrodes is made.

It is not advisable to make the whole electrode of such a material, since the properties of this electrode and the rectifying effect of the whole electrode system would be unfavourably affected thereby.

As a material yielding oxygen it is advantageous to use $KClO_3$, $BaO_2$ or $KMnO_4$, though various other materials yielding oxygen are also adapted for this purpose.

In front of the electrode provided with a material yielding oxygen may be placed electrodes consisting of different materials, in particular a metal electrode. Among the proper metals are first of all mentioned the metals of the first sub group of the fourth principal group which includes thorium, zirconium and titanium. The latter two are especially useful since these metals may be provided in a comparatively simple manner with a perfectly coherent, thin, stable oxide layer.

Furthermore the present invention permits of obtaining a considerable simplification of the electrode system. In fact, it has been found, that an excellent rectifier may be obtained by making one outer electrode of magnesium, aluminum or of an amalgam of these materials and by pressing this electrode directly against the other outer electrode consisting of a mixture of one or more sulfur compounds and a material yielding oxygen, for example, of a mixture of cuprous sulfide, cupric sulfide and potassium permanganate.

In such a rectifier an insulating intermediate layer is probably formed immediately on pressing both electrodes one against the other, thus obtaining a rectifier without special means being required for forming an intermediate layer. Thereby the previous oxidation of the magnesium or of the aluminum is rendered superfluous which consequently entails an economy in the cost of production.

The invention will be more clearly understood by reference to the accompanying drawing, representing, by way of example, an electrode system with unsymmetrical conductivity according thereto.

Figure 1:
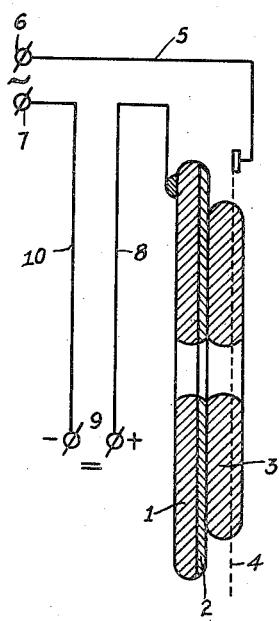
Fig. 1 is a cross section of the rectifier in which also the electric connections are schematically shown.
Figure 2:
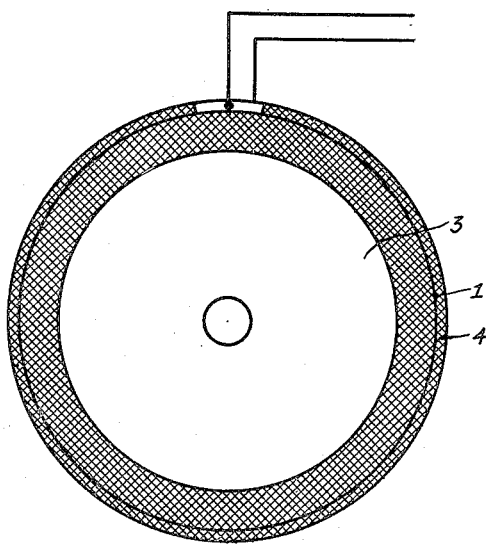
Fig. 2 is a corresponding front view.

The plate I consists, for example, of zirconium and is coated on one side with an oxide layer 2, on which bears the plate 3 consisting, for example, of a mixture of copper iodide and barium peroxide. These materials are pressed in powder on a copper gauze 4. In the drawing is shown that this copper gauze which essentially serves for obtaining a thin and yet firm plate shaped electrode, is used at the same time as a connection for the conductor 5.

The current passes only in the direction of the electrode 3 to the electrode I. During the time in which the upper terminal 6 of the source of alternating current is positive, the current consequently flows from 6 through the conductor 5, the copper gauze 4, the plate 3, the plate I, the conductor 8, the direct current terminals 9 and the conductor 10 to the other terminal 7 of the source of alternating current. During the next half period no current passes consequently the direct current load receives a pulsatory direct current.

It will be appreciated that by assembling different rectifying cells, for example, in Grätz- or Greinacher-connection, also both halves of the alternating current period may be rectified.

Of course, the invention holds also good for electrodes consisting of materials other than those referred to above. As a cathode also copper or calcium may be used instead of using one of the metals of the first sub group of the fourth principal group. Among the materials of which the anode may consist, phosphorus lead sulfide, molybdenum sulfide, iron hammer scale, sesquioxide of manganese, silver chloride or mixtures of these materials are mentioned.

What we claim is:—

1. In electric current rectifiers of the dry surface contact variety, an asymmetric couple having positive and negative electrodes, one of said electrodes comprising at least one of the metals of the first sub-group of the fourth periodic group, the other of said electrodes comprising an oxidizing agent mixed with an electrode material comprising at least one of a group of components including sulphides and iodides.

2. The combination as described in the next preceding claim wherein the last named electrode is formed by mixing a powdered oxidizing agent and powdered core material and compressing the mixture about a sheet of current conducting gauze.

3. In electric current rectifiers of the dry surface contact type, an asymmetric couple having positive and negative electrodes, one of said electrodes comprising at least one of the metals of the first sub-group of the fourth periodic group, the other of said electrodes comprising a powerful oxidizing agent chosen from the oxidizing agent group including potassium chlorate, barium dioxide, potassium permanganate mixed with an electrode material comprising at least one of a group of components including sulphides and iodides.

4. An asymmetric couple having positive and negative electrodes said positive electrode including at least zirconium, the other electrode of said couple comprising a mixture of copper iodide and barium peroxide, said last named mixture being ground and pressed on a metallic gauze, and a layer of oxide between said two plates, said layer of oxide being formed by the contact of said two plates.

WILLEM CHRISTIAAN VAN GEEL.
HENDRIK EMMENS.